(12) United States Patent
Kennedy

(10) Patent No.: US 7,957,989 B2
(45) Date of Patent: Jun. 7, 2011

(54) SYSTEM AND METHOD FOR AUTOMATICALLY GENERATING AN AIRPLANE BOARDING PASS FOR A TRAVELER RETURNING A RENTAL CAR

(75) Inventor: Brian Kennedy, Water Mill, NY (US)

(73) Assignee: The Hertz Corporation, Park Ridge, NJ (US)

( * ) Notice: Subject to any disclaimer, the term of this patent is extended or adjusted under 35 U.S.C. 154(b) by 303 days.

(21) Appl. No.: 12/156,251

(22) Filed: May 30, 2008

(65) Prior Publication Data

US 2008/0300927 A1 Dec. 4, 2008

Related U.S. Application Data

(60) Provisional application No. 60/932,574, filed on May 31, 2007.

(51) Int. Cl.
*G06Q 10/00* (2006.01)
(52) U.S. Cl. .......................................................... 705/5
(58) Field of Classification Search ........................ 705/5
See application file for complete search history.

(56) References Cited

U.S. PATENT DOCUMENTS

| 5,635,693 | A | | 6/1997 | Benson et al. | |
|---|---|---|---|---|---|
| 6,006,148 | A | * | 12/1999 | Strong | 701/33 |
| 7,040,435 | B1 | | 5/2006 | Lesesky et al. | |
| 2001/0016825 | A1 | | 8/2001 | Pugliese, III et al. | |
| 2001/0037298 | A1 | * | 11/2001 | Ehrman et al. | 705/40 |
| 2003/0093305 | A1 | * | 5/2003 | Davis et al. | 705/5 |
| 2003/0177044 | A1 | * | 9/2003 | Sokel et al. | 705/5 |
| 2006/0241983 | A1 | * | 10/2006 | Viale et al. | 705/5 |
| 2006/0265508 | A1 | * | 11/2006 | Angel et al. | 709/230 |
| 2007/0038727 | A1 | * | 2/2007 | Bailey et al. | 709/219 |
| 2007/0093215 | A1 | * | 4/2007 | Mervine | 455/99 |

OTHER PUBLICATIONS

Sweetman, Bill, "The Unwired Web", Air Transport World, pp. 10-12, 2000.*

* cited by examiner

*Primary Examiner* — John W Hayes
*Assistant Examiner* — Kevin Flynn
(74) *Attorney, Agent, or Firm* — Goodwin Procter LLP

(57) ABSTRACT

The invention provides a system and method for integrating rental vehicle return with airline boarding pass generation. The system includes a rental identification tag located on a rental vehicle and a tag reader located at a rental vehicle return facility for reading and identifying the rental vehicle identification tag when the rental vehicle enters a range of the tag reader. The system additionally includes a database containing information linking a traveler to the rental identification tag and to airline reservation information of the traveler and a computing system communicating with the database and the tag reader to locate the airline reservation information of the traveler based on the identification provided by the tag reader. The system also includes a boarding pass generator for generating a boarding pass based on the airline reservation information upon receiving an instruction from the computing system.

3 Claims, 3 Drawing Sheets

SYSTEM AND METHOD FOR AUTOMATICALLY GENERATING AN AIRPLANE BOARDING PASS FOR A TRAVELER RETURNING A RENTAL CAR

CROSS REFERENCE TO RELATED APPLICATIONS

This application claims priority to U.S. Provisional Application Ser. No. 60/932,574 filed on May 31, 2007 the entirety of which is incorporated herein by reference.

BACKGROUND

Though added security measures have slowed the boarding process at our nation's airlines over the past several years, progress has been made in expediting the part of the check-in process that occurs before one arrives at his or her destination gate. For example, tickets can be purchased easily over the Internet and bar-coded boarding passes can be printed on the day of one's flight at any printer with Internet access. In addition, readily available self check-in machines in the airport terminal can be used by passengers to avoid waiting in line for their boarding passes.

To address the needs that arise in a different mode of travel, systems have also been recently proposed to streamline the car return process at car rental facilities. In particular, U.S. Pat. No. 6,006,148 to Strong discloses an automated vehicle return system wherein status information of a rented vehicle can be automatically tracked during the rental period, transmitted to a selected destination computer upon driving the vehicle into a rental return area, and used by the destination computer to generate a bill for the rented vehicle. Electronic vehicle monitoring circuitry is tied to existing components within the vehicle to keep track of the status of the vehicle during the rental period. The status information includes miles driven, fuel level, pick up time, drop off time, wear and tear on the vehicle, and so on.

U.S. Pat. No. 5,635,693 to Benson, et al. discloses a radio frequency (RF) tagging system to monitor vehicles passing through an area access to one or more vehicle storage area(s). One or more of the vehicles stored in the storage area is equipped with an RF tag which has vehicle ID information about the vehicle stored in a tag memory contained on the tag. The tag communicates with a base station when entering or leaving the vehicle storage areas through the area accesses. A central and preferably one or more remote computers accesses status information that can include vehicle identification, customer, lot identification, time of day, and vehicle and lot status.

U.S. Pat. No. 7,040,435 discloses a system for data communication between a computer monitoring system on a vehicle and a remote terminal, which can be a hand-held operated wireless computer.

SUMMARY OF THE INVENTION

The system and method of the present invention provide an integrated automatic rental car return and airplane boarding pass generating system. The system includes a plurality of identifying (ID) tags, each of which is located on a rental car, and a reader adapted to read each identifying tag or other means of communicating information to identify a rental car as a traveler drives the car onto a rental car lot through an entrance. The reader is operably connected to a local computer with Internet access to a central database (CDB), which includes airplane travel information, if any, associated with the traveler's car rental return. A database of travelers who registered to drive one of the rental cars maintained in the rental car facility is also associated with and accessible to the local computer. The system further includes a hand-held wireless unit operated by an attendant of the rental car facility, which wirelessly communicates with the local computer to obtain airplane travel information in real-time for the traveler(s) registered as the drivers of the returned rental car and, optionally, for any other passengers traveling with the registered traveler(s) in the rental car. The airplane travel information for the traveler is then used to print a boarding pass and rental car receipt at car-side. The system can use, either in addition to or instead of the hand held device, a kiosk for the driver or another to communicate with the system. In this way the attendant need not be present or a number of attendants can use the same communication device.

DETAILED DESCRIPTION

Figure 1A:
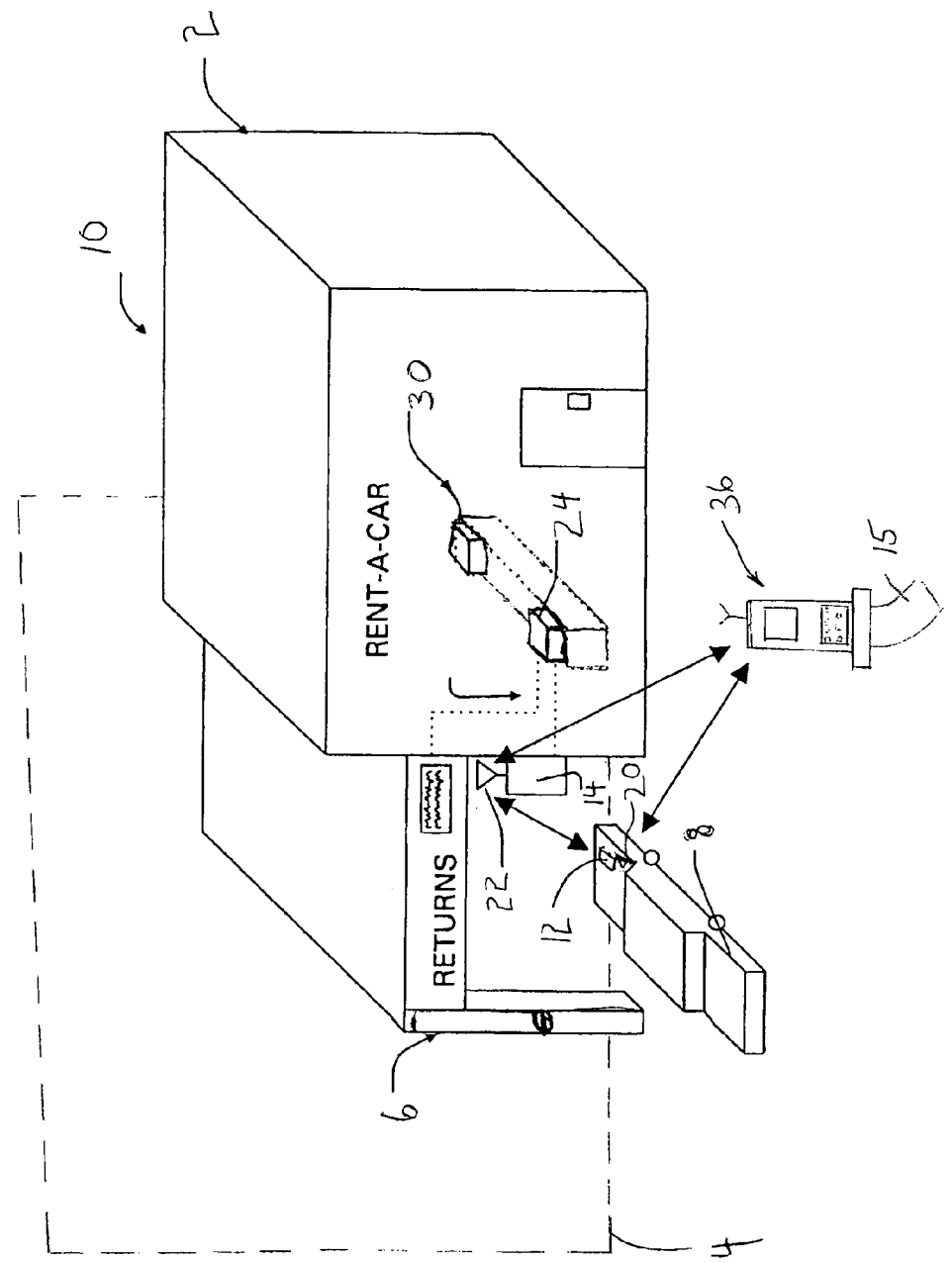
FIG. 1A is a schematic representation of an embodiment of an integrated automatic rental car return and airplane boarding pass generating system of the present invention implemented in a rental car facility.
Figure 1B:
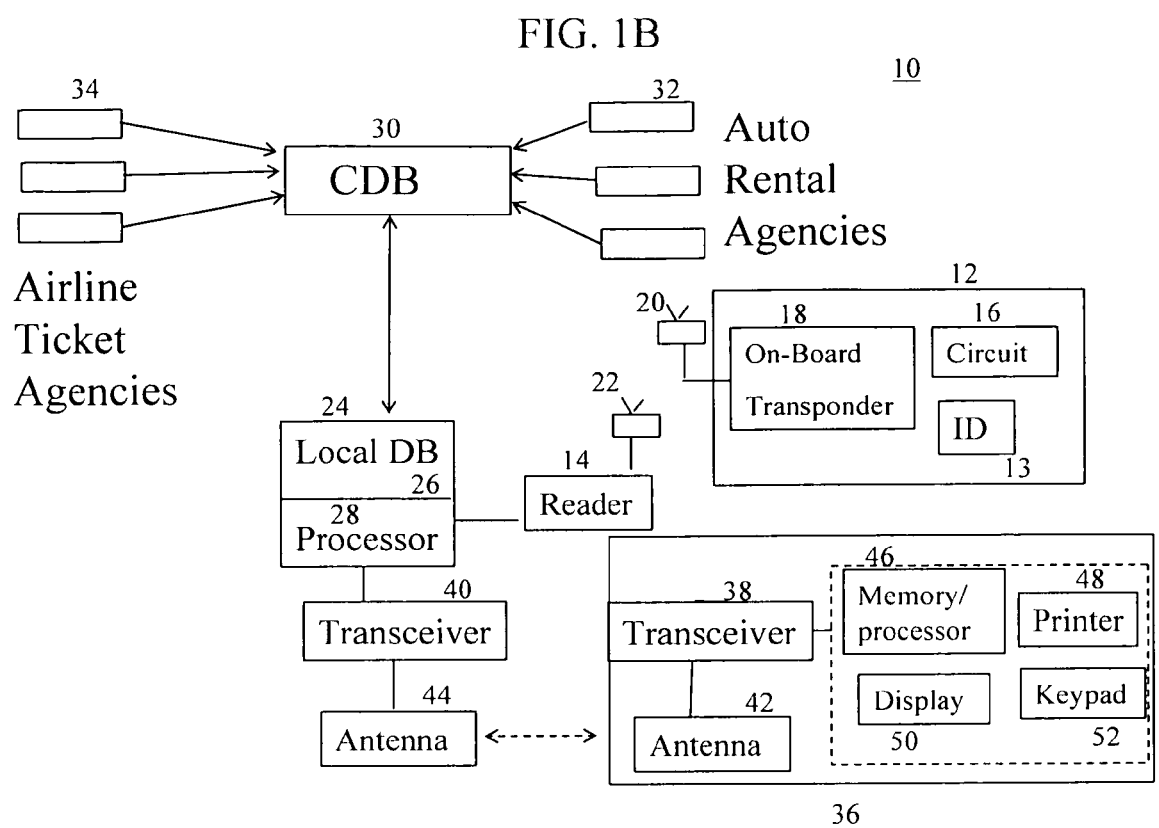
FIG. 1B is a block diagram of an embodiment of the integrated automatic rental car return and airplane boarding pass generating system represented in FIG. 1A.

The present invention provides an integrated automatic rental car return and airplane boarding pass generating system 10, which is shown schematically in FIG. 1A for a rental car facility 2. A simple block diagram of a preferred embodiment of the system 10 is shown in FIG. 1B. Referring to both FIGS. 1A and 1B, the system 10 includes a plurality of identifying (ID) tags 12, each of which is located on a rental car 8, and a reader 14 adapted to read each identifying tag 12 as a traveler drives the car 8 onto a rental car lot 4 through an entrance 6, which may be a controlled access gate.

The reader 14 is operably connected to a local computer 24 with Internet access to a central database (CDB) 30, which includes airplane travel information, if any, associated with the traveler's car rental return. The system 10 further includes a hand-held wireless unit 36 operated by an attendant of the rental car facility 2, which wirelessly communicates with the local computer 24 to obtain airplane travel information. The airplane travel information for the traveler is then used to print a boarding pass and rental car receipt 15 at car-side.

Tags and readers can be any appropriate identifying tags and readers known in the art including radio frequency (RFID), optical (including bar code), microwave, and so on. In the preferred embodiment described below, RFID tags with transponders and RF readers, or interrogators, are used. Any other means of communicating information used to identify a vehicle to the local computer upon return of the vehicle to the rental car facility may alternatively or additionally be utilized.

The RF reader 14 has a predetermined zone within which it can transmit signals to and read signals from an RFID tag 12 which overlaps with the rental car lot 4. Preferably, the predetermined zone coincides closely with the controlled access area of the rental car lot 4.

Referring to FIG. 1B, each tag 12 includes a unique identifying code 13 associated with the rental car 8 on which it is located. Each tag 12 also preferably includes or is connected to circuitry 16, which may include memory and a processor, for communicating with the reader 14 through an on-board transponder or transceiver 18. The on-board transponder 18 can transmit and receive signals to and from the RF reader 14 via antenna 20 mounted on the car 8 and on-site antenna 22. The on-site antenna 22 may be appropriately located at the entrance or exit 6 to detect any rental car 8 entering or leaving the rental car lot 4.

As the car 8 enters or leaves the rental car lot 4, the respective antenna 20 of the tag 12 and that 22 of the reader 14 are in appropriate relative proximity to each other to allow the reader 14 to identify the rental car 8. The reader 14 is operably connected to a local computer 24 with Internet access, which includes a local database 26 and processor 28, to which the reader 14 relays the identifying code. The local database 26 is continually updated with the identity of travelers requesting car rentals, along with any additional relevant information about the traveler, when each rental reservation is made. When the rental car 8 is physically signed out to, or registered with the traveler, the local database 26 is updated to associate the traveler with the code on the tag 12.

The system 10 also includes a means for communication with the central database (CDB) 30, which is accessible via the Internet and which includes additional travel information for the traveler associated with the car rental, including airline reservations. The additional travel information is preferably input to the CDB 30 at any time prior to the traveler's arrival at the car rental facility 2 through various on-line auto rental 32 and airline ticketing sources 34, for example.

In one embodiment, when the traveler requests the car rental service, he or she provides the car rental service with the necessary identifying information (such as airline reservation code) that will allow the car rental service to directly access the on-line CDB 30. It should be noted that the "central database" as used herein can refer to a plurality of databases, each maintained, for example, by a different on-line airline ticketing service.

The system 10 can access the remote CDB 30 to acquire additional travel information for the traveler associated with the car rental at any time prior to the completion of the rental car process and store it in the local database 26. In this way, when the tag 12 is read at the time a rental car is returned to the lot, the additional travel information for the traveler associated with the rental car can be immediately accessed from the local database 28. Preferably, the CDB 30 is also accessed when the returned rental car 8 enters the lot in order to obtain any updated information that may have been entered into the CDB 30.

The computer 24 processes the travel information as needed to generate an output for printing a rental receipt and, if appropriate, a boarding pass for a traveler's scheduled air flight. The boarding pass includes a bar code commonly recognizable by the bar code scanners utilized in the airline industry. The boarding pass and rental receipt 15 can be generated separately or on the same piece of paper, for example, by utilizing two sides of a paper.

The system 10 further includes a hand-held wireless unit 36 for wirelessly communicating with the local computer 24. Accordingly the hand-held unit 36 and computer 24 each include a transceiver 38 and 40 with antenna 42 and 44, respectively. Any appropriate wireless transceiver with separate or integrated antenna known in the art can be used.

The hand-held unit 36 also includes a processor with memory 46 for communicating with the computer 24 and for receiving data relating to a receipt and boarding pass from the computer 24. The unit 36 also includes a printer 48. The unit 36 uses the data to print the receipt and boarding pass on the printer 48. Preferably, the hand-held unit 36 further includes a display 50 and keypad 52 that allows an operator to read and enter information passed to and from the computer 24 as necessary.

It should be noted that the hand-held unit 36, reader 14, and RFID tag 12 can all be configured to be in two-way wireless communication with each other, each using any appropriate RF transceiver and antenna to communicate. It is only necessary however, for the reader 14 and tag 12 to operate as an interrogator and transponder respectively. The system can use, either in addition to or instead of the hand held device, a kiosk for the driver or another to enter information into the system. In this way the attendant need not be present or a number of attendants can use the same communication device.

In a method of the present invention (FIG. 2), the ID tag 12 is scanned and the car is identified 50 upon entering the lot. A traveler ID field is preferably provided in the records for the traveler's rental information in the local database 26 that can be associated with a traveler ID field in the CDB 30. Accordingly, the processor 28 can automatically retrieve flight information for the traveler from the CDB 30 by linking to the record in the central database 30 associated with the same traveler ID. As a result, the encoded information retrieved on the ID tag 12 of the returned rental car allows flight information to be pulled 56 for the rental car driver as he or she enters the lot. If there is no flight information associated with the traveler ID, only a driver rental receipt will be printed 62. If there is flight information, a corresponding boarding pass is printed out 58 along with the rental return receipt from a printer 48 (see FIG. 1B) operably connected to the local processor 28.

The ID tag can be mounted in any accessible safe location on or in the car. In one embodiment, the RFID circuit 16 associated with the tag 12 on each car dynamically updates the mileage and gas tank levels of the car 8 either directly from the sensors on the car 8 or through the on-board computer, so that when the traveler drives into the rental car lot 4, the final bill is automatically tabulated. The additional charges can be billed against the credit card used to check in.

In another embodiment, once the reader obtains the encoded information from the tag, and before releasing the car (by opening a security gate, e.g.) to fully enter the lot, the receipt and boarding pass are printed out for pickup by the traveler/driver at the entrance, rather than from a hand-held unit or a kiosk. In this case, the printer is operably connected to the networked local computer rather than the hand-held unit, and both computer 24 and printer 48 are located at the entrance. The printed pass and receipt are then retrievable by the driver as in any drive-through banking or parking service while still seated in the car, from a slot or pull-down drawer, for example.

Figure 2:
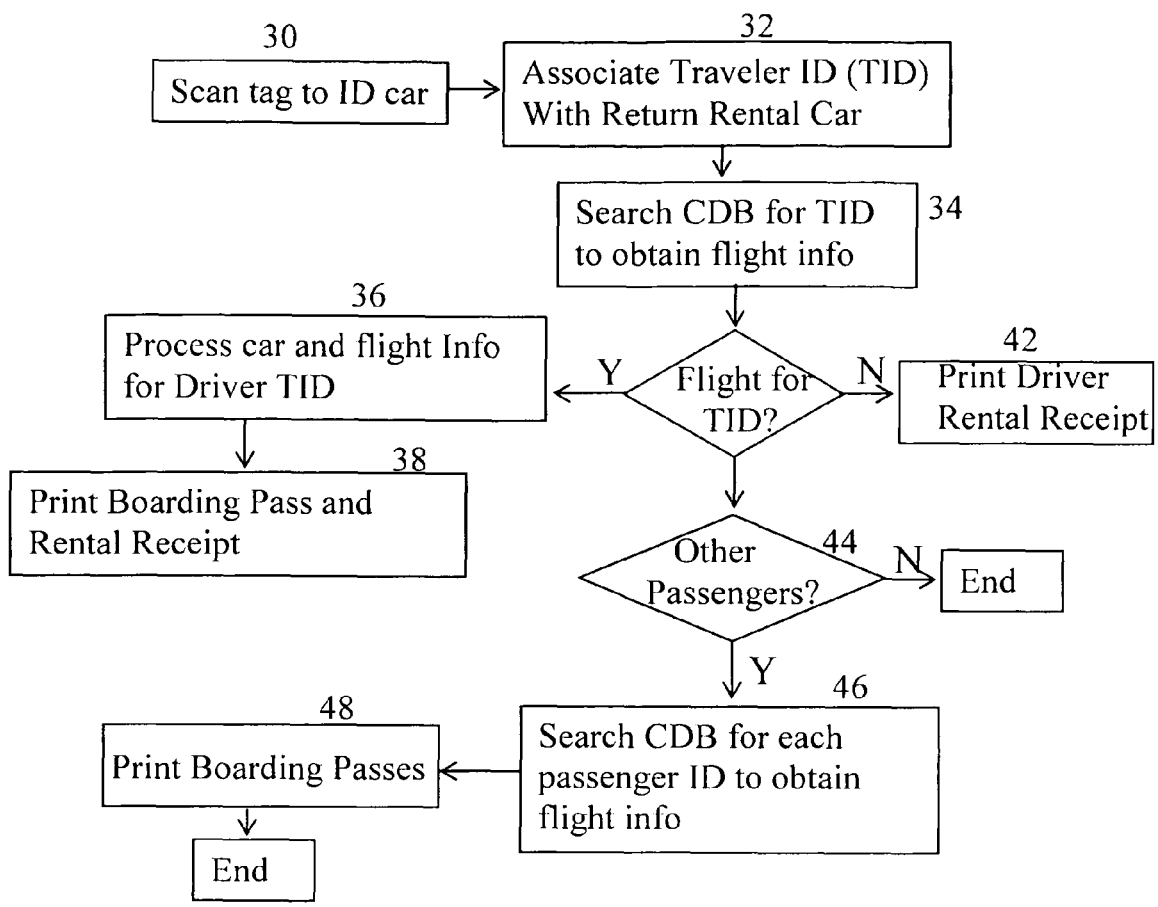
FIG. 2 is a flow chart representation of a method of the present invention.

Referring to FIG. 2, in one embodiment, upon the driver's retrieval of his or her rental receipt and boarding pass (if appropriate), the processor will prompt the driver as to whether boarding passes are needed for any other passengers in the car 64. Upon entry of identification information (e.g., credit card) for each passenger, the CDB 30 will be searched and any additional boarding passes will be processed 66 and printed 68 as needed. In addition, if more than one airline ticket was purchased by the driver of the rental for family members, for example, these boarding passes will also be printed out at the time of car rental return.

These user-interactive features can be performed via an attendant through a hand-held reader with, for example, an integrated PDA, by the attendant or traveler through a kiosk, or at the entrance, using the display and keypad on the local computer.

Although illustrative embodiments of the present invention have been described herein with reference to the accompanying drawings, it is to be understood that the invention and claims are not limited to those precise embodiments, and that various other changes and modifications may be applied therein by one skilled in the art without departing from the scope or spirit of the invention. As will also be apparent to those skilled in the art, various combinations of the embodiments and features taught in the foregoing description are possible and can result in preferred executions of the present invention. Accordingly, it is intended that such changes and modifications fall within the scope of the present invention as defined by the claims appended hereto.

What is claimed is:

1. A system for integrating rental vehicle return with airline boarding pass generation, the system comprising:
   a rental identification tag located on a rental vehicle;
   a tag reader located at a rental vehicle return facility configured to read and identify said rental vehicle identification tag when the rental vehicle enters a range of said tag reader;
   a database containing information linking a traveler to said rental identification tag and to airline reservation information for the traveler;
   a processor configured to communicate with said database and said tag reader and locate said airline reservation information of the traveler based on said identification provided by said tag reader; and
   a boarding pass generator configured to generate a boarding pass based on said airline reservation information upon receiving an instruction from said processor.

2. The system of claim 1, wherein said boarding pass generator further comprises a receipt generator configured to generate a rental vehicle receipt.

3. The system of claim 2, wherein said boarding pass and said rental vehicle receipt comprise a single item.

* * * * *